з,264,296
PYRIMETHAMINE SALT WITH 4,4'-THIOBIS (3-HYDROXY-2-NAPHTHOIC ACID)
Edward F. Elslager and Donald F. Worth, Ann Arbor, Mich., assignors to Parke, Davis & Company, Detroit, Mich., a corporation of Michigan
No Drawing. Original application Apr. 20, 1962, Ser. No. 188,984, now Patent No. 3,161,641, dated Dec. 15, 1964. Divided and this application Apr. 24, 1964, Ser. No. 362,472
1 Claim. (Cl. 260—256.5)

This application is a division of our copending application Serial No. 188,984, filed April 20, 1962, now U.S. Patent 3,161,641.

The present invention relates to a salt of 2,4-diamino-5-(p-chlorophenyl)-6-ethylpyrimidine with 4,4'-thiobis(3-hydroxy-2-naphthoic acid) and to methods for the production thereof.

The compound of the invention is produced by direct reaction of 2,4-diamino-5-(p-chlorophenyl)-6-ethylpyrimidine with 4,4'-thiobis(3-hydroxy-2-naphthoic acid), or by reacting a soluble salt of 2,4-diamino-5-(p-chlorophenyl)-6-ethylpyrimidine with a double salt of said acid. The term "soluble salt" is used herein in a relative sense and means a degree of solubility substantially greater than that exhibited by the product of the invention. Representative soluble salts of the pyrimidine base suitable for use in the process of the invention include the hydrochloride, hydrobromide, hydriodide, sulfate, phosphate, sulfamate, acetate, lactate, tartrate, gluconate, citrate, and salicylate. Representative soluble salts of the acid that are suitable for use in the process of the invention include the alkal metal, alkaline earth metal, ammonium and amine salts. The invention comprehends the starting materials and final product in their hydrated as well as anhydrous forms. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, by treatment of an acid-addition salt with a base, or by treatment of the pyrimidine base with an acid. The process of the invention is preferably carried out in a solvent in which the reactants are at least partially soluble and which is relatively unreactive toward each of the reactants. Suitable solvents include water, aqueous alkanols, dimethylacetamide, acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although a high yield and a crystalline form conducive to rapid filtration may be facilitated by heating the reaction mixture for up to about an hour and then chilling it. The reactants are customarily employed in approximately the same ratio in which they appear in the desired final product. To obtain the salt of the pyrimidine base with one-half formula weight of the acid it is customary to employ these reactants or soluble salts thereof in the ratio of 2 moles of the former to 1 mole of the latter. If it is desired to obtain the salt of the pyrimidine base with one formula weight of the acid best results are obtained by reacting a soluble salt of the pyrimidine base with an equimolar quantity of a soluble salt (such as the disodium salt) of the acid in the presence of one equivalent of a mineral acid. Where the reaction product precipitates directly it is isolated by filtration or centrifugation. In those instances where it does not precipitate directly it is first made insoluble by concentration of the reaction mixture or by dilution of the reaction mixture with a solvent in which the product is insoluble, and then collected.

The product of the invention is an antimalarial agent exhibiting especially long duration of action. It is known that 2,4-diamino - 5 - (p-chlorophenyl)-6-ethylpyrimidine, otherwise known as pyrimethamine, is an antimalarial drug and is highly active against erythrocytic parasites. However, for collective prophylaxis the usual recommended adult dose is 25 mg. administered once a week. For large scale malaria eradication programs it is impractical to administer an antimalarial agent on such a frequent schedule. However, the compound of the present invention possesses the high antimalarial activity of 2,4-diamino - 5 - (p - chlorophenyl) - 6 - ethylpyrimidine, is non-irritating upon injection, and exhibits unusually long duration of action, thereby making it possible to extend the dosage interval from one week to as long as several months. The product of the invention can be formulated into suspensions which are pharmaceutically acceptable for intramuscular injection, using suspending vehicles such as 40% benzyl benzoate and 60% castor oil, or water containing emulsifying or dispersing agents.

The invention is illustrated by the following example.

*Example*

A solution of 0.808 g. of 4,4'-thiobis(3-hydroxy-2-naphthoic acid) in 100 ml. of water containing 4.0 ml. of 1 N sodium hydroxide solution is poured with stirring into a solution of 1.00 g. of 2,4-diamino-5-(p-chlorophenyl)-6-ethylpyrimidine in 100 ml. of methanol and 4.0 ml. of 1 N hydrochloric acid. Upon cooling, the precipitate is collected by filtration, washed thoroughly with water and dried. Crystallization of the crude salt from an acetone-water mixture gives the desired 2,4-diamino-5-(p-chlorophenyl)-6-ethylpyrimidine, salt with ½ formula weight of 4,4'-thiobis(3-hydroxy-2-naphthoic acid), hydrate; yellow crystals, M.P. 220° C. (dec.).

We claim:
A salt of 2,4-diamino-5-(p-chlorophenyl)-6-ethylpyrimidine with one-half formula weight of 4,4'-thiobis(3-hydroxy-2-naphthoic acid).

References Cited by the Examiner
UNITED STATES PATENTS

| | | | |
|---|---|---|---|
| 2,576,939 | 12/1951 | Hitchings et al. | 260—256.4 |
| 3,095,443 | 6/1963 | Cavallini et al. | 260—516 X |
| 3,150,170 | 9/1964 | Cavallini et al. | 260—516 X |

ALEX MAZEL, *Primary Examiner.*
HENRY R. JILES, *Examiner.*
MARY E. O'BRIEN, *Assistant Examiner.*